United States Patent [19]
Holmes et al.

[11] 4,138,893
[45] Feb. 13, 1979

[54] HYDROSTATIC ACCELEROMETER

[75] Inventors: Allen B. Holmes, Rockville; Stacy E. Gehman, Takoma Park, both of Md.

[73] Assignee: The United States of America as represented by the Secretary of the Army, Washington, D.C.

[21] Appl. No.: 858,982

[22] Filed: Dec. 9, 1977

[51] Int. Cl.² ............................................. G01P 15/08
[52] U.S. Cl. ................................ 73/516 LM; 73/654
[58] Field of Search ................. 73/514, 515, 516 LM, 73/652, 654

[56] References Cited
U.S. PATENT DOCUMENTS

| | | | |
|---|---|---|---|
| 2,776,829 | 1/1957 | Cockram | 73/515 |
| 3,587,326 | 6/1971 | Riordan et al. | 73/516 LM X |
| 3,828,294 | 8/1974 | Baba et al. | 73/516 LM X |

*Primary Examiner*—James J. Gill
*Attorney, Agent, or Firm*—Nathan Edelberg; Robert P. Gibson; Saul Elbaum

[57] ABSTRACT

A low "g" hydrostatic accelerometer including a differential pressure transducer interposed between a sensing mass, and a pressurized low density fluid.

6 Claims, 2 Drawing Figures

HYDROSTATIC ACCELEROMETER

RIGHTS OF THE GOVERNMENT

The invention described herein may be manufactured, used, and licensed by or for the United States Government for governmental purposes without the payment to us of any royalty thereon.

BACKGROUND OF THE INVENTION

This invention relates to fluid accelerometers and more particulary to accelerometers for the measurement of low magnitude vibration and linear acceleration. Specifically, the present invention relates to accelerometers wherein a fluid acts as a sensing mass and a differential pressure transducer provides the electrical output in response to the "g" loading. The accelerometers of the invention are applicable for micro "g" and higher "g" measurements.

Fluid accelerometers are known to sense the time integral of acceleration. The accelerometers of the present invention differ from conventional accelerometers because there is virtually no distortion of movement involved in the sensing mass. In a typical device of the present invention the hydrostatic pressures developed in the fluid sensing mass are directly proportional to the applied "g" load and measured by differential pressure transducers.

SUMMARY OF THE INVENTION

It is an object of this invention to provide accelerometers which are inherently insensitive to transverse loads.

Other objects of this invention are to provide accelerometers which are unaffected by high accoustic noise levels, are operable in a wide temperature range, and are insensitive to impact loading during handling.

A further object is to provide an accelerometer capable of measure micro "g" forces using available transducers.

The present invention achieves the objects set forth by differentially loading a pressure transducer to increase the sensitivity of the transducer to low and micro "g" forces. The accelerometers of the present invention include a housing having a first interior chamber and a second interior chamber, separated by a differential pressure transducer. The first chamber includes a sensing mass and the second chamber includes a pressurized low density fluid. The sensing mass may be solid, liquid or a combination thereof. The low density fluid may be any gas or low density liquid that is relatively insensitive to "g" forces to be measured within the range sensitivity of the transducer. The density of the sensing mass must be higher relative to the low density fluid.

The sensing mass and the pressurized low density fluid maintain a differential pressure across the transducer at a level less than the range of the gauge employed. The sensing mass is responsive to the low "g" force whereas the low density fluid is for all practical purposes insensitive to the low "g" force.

These and other objects and advantages of this invention will be apparent from the following description with reference to the accompanying drawings.

DESCRIPTION OF THE PREFERRED EMBODIMENT

Figure 1:
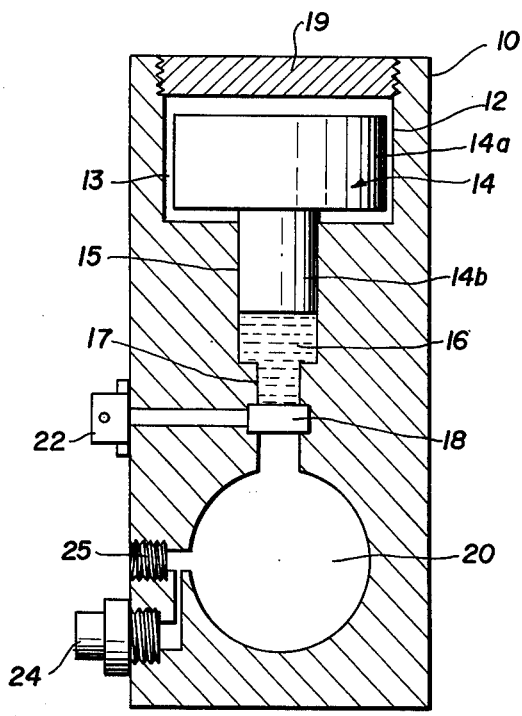
FIG. 1 is a cross-sectional view of an accelerometer for the measurement of micro "g" forces according to the present invention.

Referring now to FIG. 1, a micro"g" sensor according to this invention is illustrated, which comprises a container or housing 10 made of a rigid material having a first chamber 12 therein. A sensing mass 14 and sensing fluid 16 are accommodated in the chamber 12.

The liquid 16 is disposed between the sensing mass 14 and a differential pressure transducer 18. Chamber 12 has a plurality of consecutive sections of different cross sectioned areas from one chamber to another which decrease towards the transducer 18. Three such sections, 13, 15 and 17 are shown. The sensing mass 14 includes a large section 14a within chamber portion 13 and smaller section 14b within chamber portion 15. The liquid 16 occupies the remainder of section 15 and all of section 17. The increasing cross sections of chamber 12 and the mass 14 allows the maximum mass per unit length of the mass 14 and an amplification for forces exerted by the sensing mass 14 and liquid 16 onto the face of transducer 18. The cross section of chamber section 17 is equal or greater than the cross section of contiguous face of the transducer 18 for maximum transmission of the forces. The large portion 14a has a length less than the length of chamber section 13 to allow for the displacement of mass 14 due to the thermal expansion of liquid 16 which is confined to chamber portion 15 by a relatively close fit of the mass portion 14b chamber portion 15. A cap 19 provides access to chamber 12.

The other side of differential pressure transducer 18 is contiguous with a second chamber or reservoir 20 which is pressurized by a low density fluid controlled through charging port 24 or by means of valve 25. Chamber 20 has a decreased cross section at the transducer 18 for maximum transmission of the pressurized force. A transducer output connector 22 is provided external housing 10 to transmit the signal.

In this embodiment, all of the chambers and chamber portions are colinear and lie along the "g" axis.

The first chamber 12 may be a plurality of consecutive sections of different cross sectioned areas decreasing in size toward the transducer as shown or the chamber may be of equal cross sectional area throughout.

Figure 2:
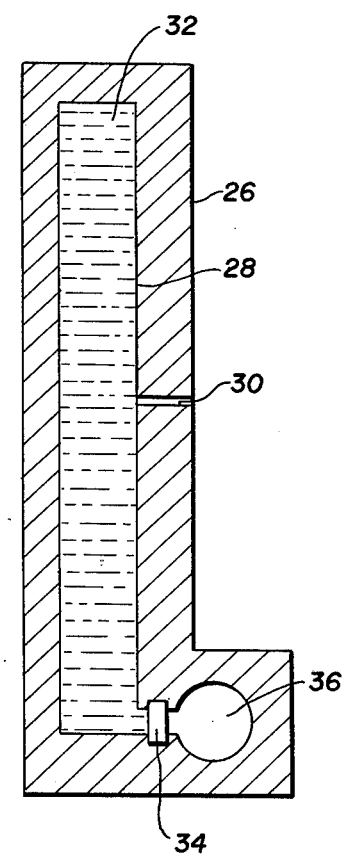
FIG. 2 is a cross-sectional view of an accelerometer for low "g" force measurements according to the present invention.

A low "g" sensor according to the invention is illustrated in FIG. 2 in which a container or housing 26 has a hollow portion or first interior chamber 28 having a vent 30 and is filled with a liquid sensing mass 32 and having a differential pressure transducer 34 disposed between said liquid chamber and a second interior chamber 36, said chamber having a charging port and valve (not shown). The differential pressure transducer is connected to a transducer output connector (not shown).

In the event that extremely high temperatures produce thermal expansion and force a portion of sensing fluid 32 out of vent 30, the pressurized fluid in chamber 36 may be adjusted to maintain the pressure gradient.

The reservoir may be aligned along the "g" axis as shown in FIG. 1 or offset and perpendicular to the sensing mass chamber as shown in FIG. 2.

The chamber including the sensing mass may have a hollow portion of decreasing cross sectioned area as shown in FIG. 1 or may be of uniform cross sectioned area as shown in FIG. 2.

The differential pressure transducers employed in the present invention are resistive strain gauges that respond to steady state and dynamics pressure loading. These gauges combine the major advantages of low cost, subminiature size, excellent linearity, repeatability and proven reliability.

The high output and low impedance inherent in these transducers make the hydrostatic accelerometers of the present invention suitable for use in hostile environments without the need for expensive signal conditioning equipment. Possible applications for the accelerometers of the invention are for the detection and monitoring of earthquakes and nuclear explosions when placed for example in abandoned oil wells, as sensors for oceanic wave motion studies, as motion sensors for offshore platforms, for the monitoring of troop and equipment movement, for measuring vehicle motion of reentry vehicles or earth penetrating missiles and as level sensors. The resolution of the hydrostatic accelerometer of this invention are determined by the operating characteristics of the differential pressure transducers on gauges used to measure pressure. The gauges used in a typical unit can produce a reliable output equal to about 1/750 of its rated full scale output. This means that a gauge rated at twenty-five psi can resolve a pressure equal to 0.033 psi. The "g" loading required to produce this pressure establishes the lower sensitivity limit of a given device.

The upper limit on range is established by the maximum pressure that the transducer can be operated at within its linear range. The "g" load or pressure that a given device can withstand before damage occurs to the instrument is equal to two times its rated output.

Sensitivity can be extended by biasing the pressure gauges. For example, if a twenty-five psi gauge has a load equal to twenty-five psi on it at one g, this pressure can be balanced with a pressure that is equal and applied to the opposite side of the transducer as shown in the drawings. Doing this also permits using a more sensitive transducer if higher sensitivity is needed.

Ultra-low or micro "g" measurements can be accomplished with the embodiment illustrated as FIG. 1. In this embodiment the weight of the sensing mass is used to develop a high pressure (about 1,000 psi) in the sensing chamber. Thus, for every "g" applied to the unit, the pressure will increase by 1,000 psi. However, the measurement of micro "g" forces, of the order of $3 \times 10^{-5}$g, equivalent to 0.03 psi, requires a sensitive gauge such as a biased gauge with a full scale range of 25 psi and the pressurizing of the reference side of the gauge with a low density fluid.

The liquid sensing mass can be any suitable liquid such as Dow Corning 200 Fluid or mercury. The vent 30 is adapted to provide for thermal expansion of the liquid sensing mass.

From the preceding description of the preferred embodiments, it is evident that the objects of the invention are attained and although the invention has been described and illustrated in detail, it is to be clearly understood that the same is by way of illustration and example only and is not to be taken by way of limitation. The spirit and scope of this invention is to be limited only by the terms of the appended claims.

We wish it to be understood that we do not desire to be limited to the exact details of construction shown and described, for obvious modifications can be made by a person skilled in the art.

We claim:

1. A hydrostatic accelerometer for the measurement of "g" forces comprising:
   a housing member including a first interior chamber and a second interior chamber;
   a differential pressure transducer situated between and separating said first and second interior chambers;
   a sensing mass in said first interior chamber comprising a solid sensing mass and a liquid sensing mass, said liquid sensing mass abutting said differential pressure transducer;
   a low density fluid in said second interior chamber; and
   means for adjusting the pressure in said second chamber.

2. The accelerometer of claim 1 wherein said first interior chamber further comprises a plurality of sections of different cross section areas diminishing towards said transducers and said solid sensing mass comprises at least one area of diminished cross section to engage with a corresponding section of said first interior chamber to form an expansible chamber containing said liquid sensing mass.

3. The accelerometer of claim 2 wherein the "g" load that said differential pressure transducer can withstand without damage is at least equal to two times its rated output.

4. The accelerometer of claim 3 wherein said means for adjusting pressure comprises a valve and said second interior chamber is pressurized to create a force on said transducer within the range from the force created by said sensing mass at equilibrium to the capacity of said transducer minus the maximum expected force to be created by said sensing mass.

5. The accelerometer of claim 4 wherein said first and second interior chambers are co-linear.

6. The accelerometer of claim 5 wherein said low density fluid is substantially insensitive to the range of "g" forces to be measured.

* * * * *